United States Patent
Shiratori

(10) Patent No.: US 12,030,440 B2
(45) Date of Patent: Jul. 9, 2024

(54) SUPPORT MEMBER, WIRING MEMBER WITH SUPPORT MEMBER, AND ATTACHMENT STRUCTURE FOR WIRING MEMBER

(71) Applicant: SUMITOMO WIRING SYSTEMS, LTD., Mie (JP)

(72) Inventor: Syo Shiratori, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 330 days.

(21) Appl. No.: 17/611,900

(22) PCT Filed: Feb. 26, 2020

(86) PCT No.: PCT/JP2020/007561
§ 371 (c)(1),
(2) Date: Nov. 16, 2021

(87) PCT Pub. No.: WO2020/240951
PCT Pub. Date: Dec. 3, 2020

(65) Prior Publication Data
US 2022/0234527 A1    Jul. 28, 2022

(30) Foreign Application Priority Data
May 30, 2019  (JP) .............................. JP2019-101547

(51) Int. Cl.
*B60R 16/02*    (2006.01)
*H01B 7/00*    (2006.01)
(Continued)

(52) U.S. Cl.
CPC ....... *B60R 16/0215* (2013.01); *H01B 7/0045* (2013.01); *H01B 7/40* (2013.01); *H02G 3/04* (2013.01); *H02G 3/30* (2013.01)

(58) Field of Classification Search
CPC ........ B60R 16/0215; H02G 3/04; H02G 3/30; H02G 3/32; H01B 7/40
See application file for complete search history.

(56) References Cited

U.S. PATENT DOCUMENTS

2011/0108150 A1* 5/2011 Renaud ............ F02M 35/10144
24/457
2020/0141518 A1 5/2020 Nakano et al.
2020/0355299 A1 11/2020 Nishimura et al.

FOREIGN PATENT DOCUMENTS

JP           H0577682 U  * 10/1993 ................ F16L 3/08
JP          2000-166061 A    6/2000
(Continued)

OTHER PUBLICATIONS

International Search Report issued on May 26, 2020 for WO 2020/240951 A1 (4 pages).

*Primary Examiner* — Paresh Paghadal
(74) *Attorney, Agent, or Firm* — Venjuris, P.C.

(57) ABSTRACT

Provided is a technology for supporting a wiring member with a rod-like member including a plurality of rod-like portions connected in the radial direction. A support member configured to be attached to a rod-like member including a plurality of rod-like portions connected in a radial direction includes an engagement portion configured to fit over the plurality of rod-like portions and engage with an outer circumferential portion of the rod-like member, wherein a wiring member is provided in an attachable manner on an outer side of the engagement portion.

7 Claims, 9 Drawing Sheets

(51) Int. Cl.
*H01B 7/40* (2006.01)
*H02G 3/04* (2006.01)
*H02G 3/30* (2006.01)

(56) References Cited

FOREIGN PATENT DOCUMENTS

| | | |
|---|---|---|
| JP | 2002-176716 A | 6/2002 |
| WO | 2019/097792 A1 | 5/2019 |

* cited by examiner

SUPPORT MEMBER, WIRING MEMBER WITH SUPPORT MEMBER, AND ATTACHMENT STRUCTURE FOR WIRING MEMBER

CROSS REFERENCE TO RELATED APPLICATIONS

This application is a national phase of PCT application No. PCT/JP2020/007561, filed on 26 Feb. 2020, which claims priority from Japanese patent application No. 2019-101547, filed on 30 May 2019, all of which are incorporated herein by reference.

TECHNICAL FIELD

The present disclosure relates to a support member, a wiring member with a support member, and an attachment structure for a wiring member.

BACKGROUND

In Patent Document 1, technology for supporting a wire harness on a rod-like member is described. The wire harness with a support member described in Patent Document 1 is provided with a wire harness including an electrical wire and a support member including an engagement portion formed in a partially cylindrical shape that is opened partially in a circumferential direction so as to be capable of engaging with an outer peripheral portion of a rod-like member, wherein a support portion for supporting the wire harness disposed along the outer periphery of the engagement portion at a fixed position with respect to the engagement portion is formed on at least one of the wire harness and the support member.

PRIOR ART DOCUMENT

Patent Document

Patent Document 1: JP 2019-004679 A

SUMMARY OF THE INVENTION

Problems to be Solved

A rod-like member installed in a vehicle is constituted by a plurality of rod-like portions connected to one another in the radial direction.

Thus, an object is to provide technology for supporting a wiring member with a rod-like member including a plurality of rod-like portions connected in the radial direction.

Means to Solve the Problem

A support member according to the present disclosure is configured to be attached to a rod-like member including a plurality of rod-like portions connected in a radial direction and includes: an engagement portion configured to fit over the plurality of rod-like portions and engage with an outer circumferential portion of the rod-like member, wherein a wiring member is provided in an attachable manner on an outer side of the engagement portion.

Effect of the Invention

According to the present disclosure, a wiring member can be supported by a rod-like member including two or more rod-like portions connected in the radial direction.

DETAILED DESCRIPTION TO EXECUTE THE INVENTION

Description of Embodiments of Disclosure

Figure 1:
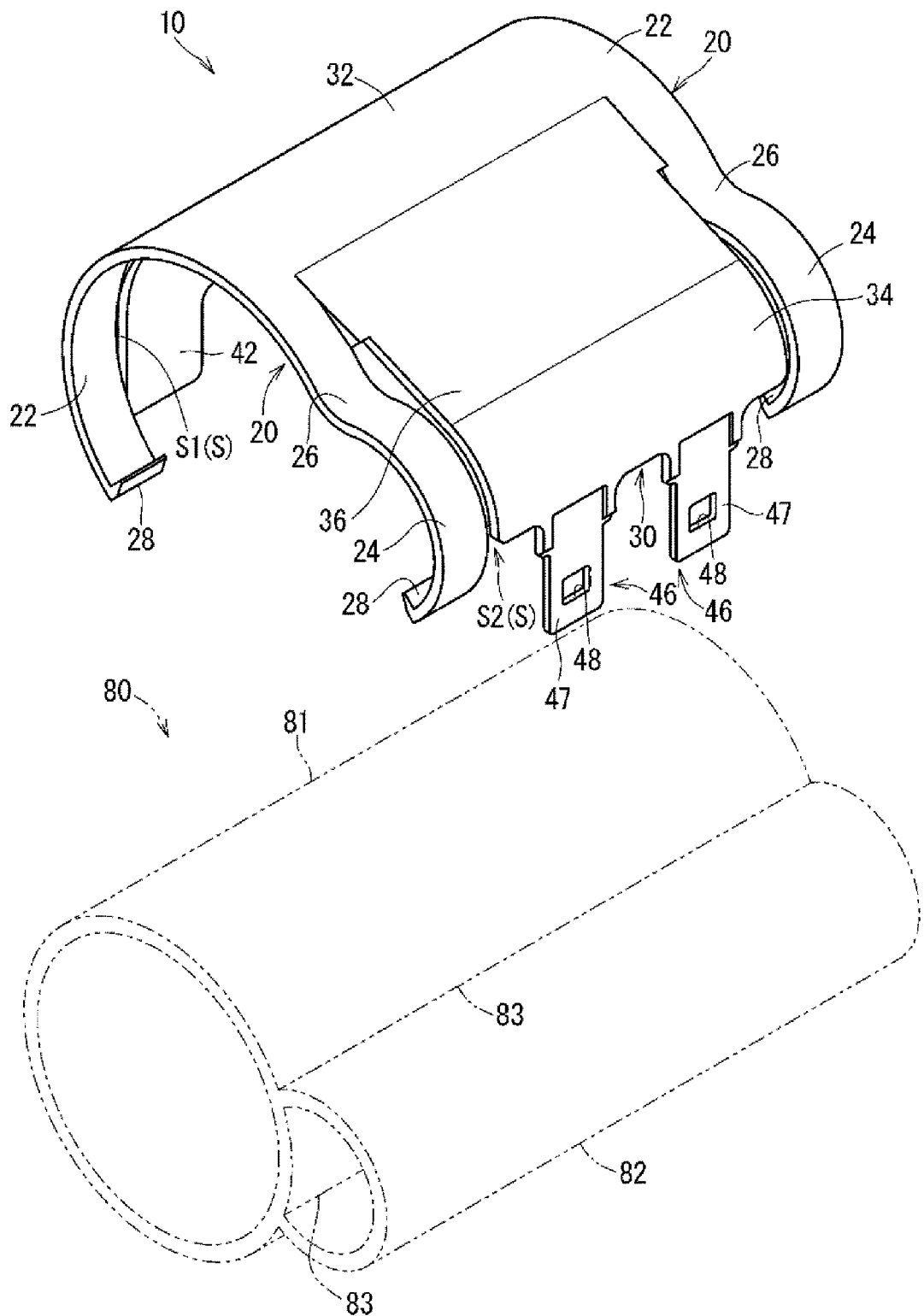
FIG. 1 is a perspective view illustrating a support member according to an embodiment.

Firstly, embodiments of the present disclosure will be listed and described.
A support member according to the present disclosure is as follows.

1. A support member configured to be attached to a rod-like member including a plurality of rod-like portions connected in a radial direction, the support member including: an engagement portion configured to fit over the plurality of rod-like portions and engage with an outer circumferential portion of the rod-like member, wherein a wiring member is provided in an attachable manner on an outer side of the engagement portion. The support member can be attached to the rod-like member including a plurality of rod-like portions connected in the radial direction via the engagement portion. By using the support member, the wiring member can be supported by the rod-like member including the plurality of rod-like portions connected in the radial direction.

2. A body portion contiguous with the engagement portion in an axial direction may be further provided, wherein a slit may be formed between the engagement portion and the body portion. Accordingly, when the engagement portion is engaged with the rod-like member, the engagement portion can easily deform with a small force, and the engagement portion can be easily engaged with the rod-like member.

3. The plurality of rod-like portions may include a first rod-like portion and a second rod-like portion narrower than the first rod-like portion; the slit may include a first slit formed on a first rod-like portion side and a second slit formed on the second rod-like portion side; and the second slit may be formed deeper than the first slit. Accordingly, when the engagement portion is engaged with the rod-like member, the engagement portion can easily deform with a small force, and the engagement portion can be easily engaged with the rod-like member.

4. The engagement portion may be shorter than the body portion in the axial direction. Accordingly, when the engagement portion is engaged with the rod-like member, the engagement portion can easily deform with a small force, and the engagement portion can be easily engaged with the rod-like member.

5. A portion of the body portion that covers a connection portion of the plurality of rod-like portions may be formed in a flat shape. Accordingly, when the flat wiring member is supported by the body portion, the flat wiring member resists deflection.

6. A portion of the engagement portion that covers a connection portion of the plurality of rod-like portions may be formed recessed toward the connection portion. Accordingly, the engagement portion more easily deforms pivoting about a portion recessed toward the connection portion.

7. A wiring member with a support member according to present disclosure includes: the support member described above; and a wiring member supported by the support member. The support member can be attached to the rod-like member including a plurality of rod-like portions connected in the radial direction via the engagement portion. By using the support member, the wiring member can be supported by the rod-like member including the plurality of rod-like portions connected in the radial direction.

8. The wiring member may include a plurality of linear transmission members and a sheet that holds the plurality of linear transmission member in arrangement. This can help keep the height dimension of the wiring member from the support member low.

9. An attachment structure for a wiring member according to the present disclosure includes: the wiring member with a support member described above; and a rod-like member including a plurality of rod-like portions connected in a radial direction, wherein the engagement portion is engaged with the rod-like member. The support member can be attached to the rod-like member including a plurality of rod-like portions connected in the radial direction via the engagement portion. By using the support member, the wiring member can be supported by the rod-like member including the plurality of rod-like portions connected in the radial direction.

Description of Embodiments

Specific examples of a support member, a wiring member with a support member, and an attachment structure for a wiring member are described below with reference to the drawings. Note that the present disclosure is not limited to these examples and is defined by the scope of the claims, and all modifications that are equivalent to or within the scope of the claims are included.

Embodiments

Figure 2:
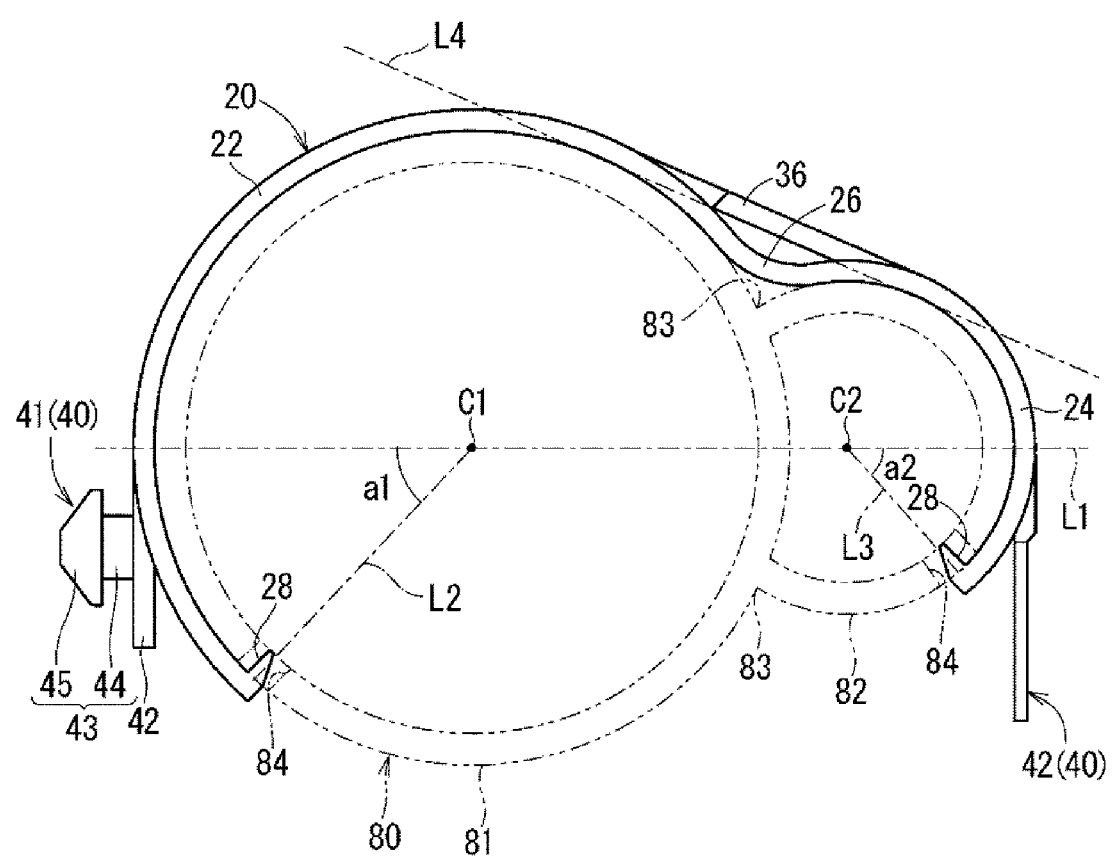
FIG. 2 is a front view illustrating the support member according to the embodiment.
Figure 3:
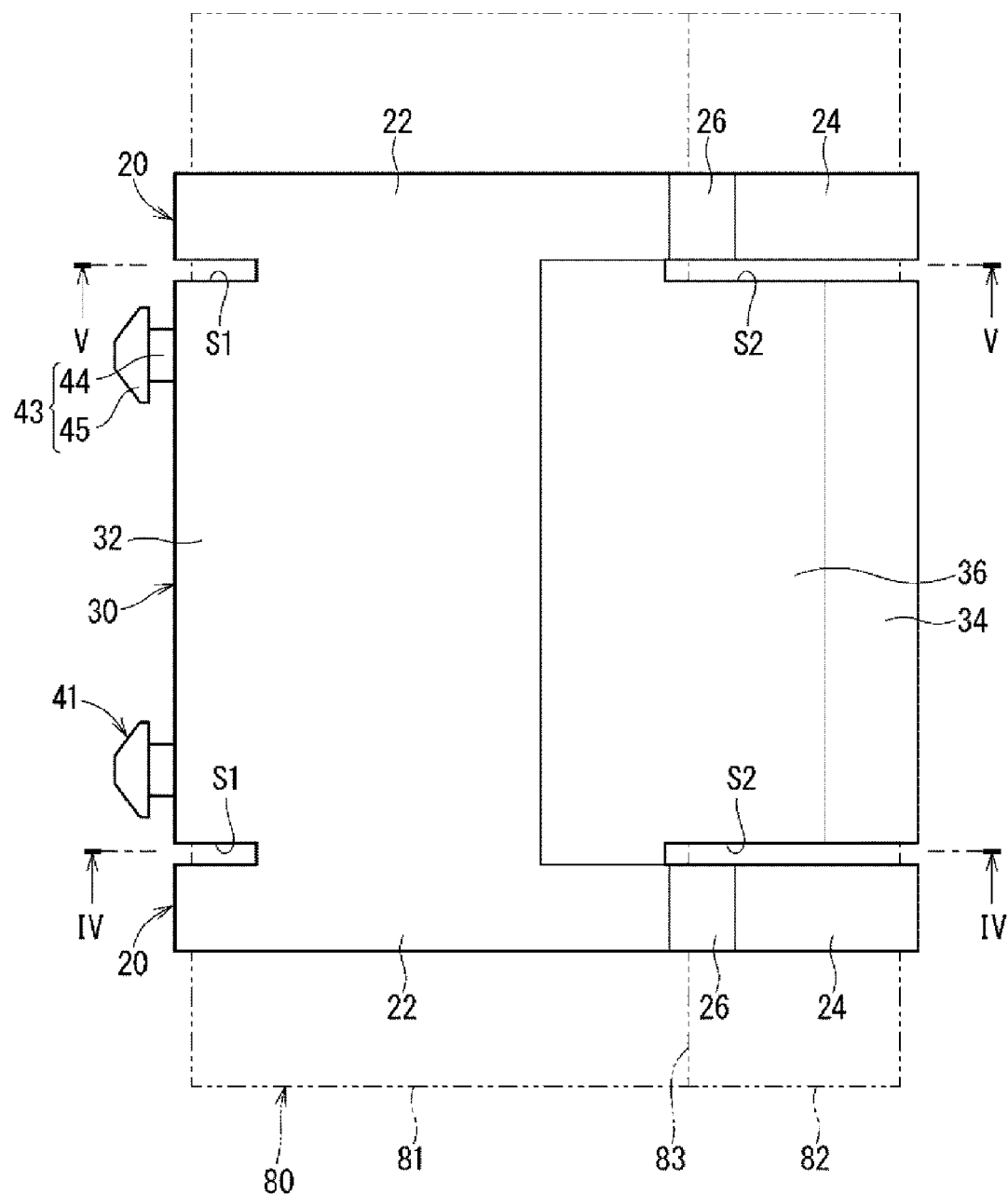
FIG. 3 is a plan view illustrating the support member according to the embodiment.
Figure 4:
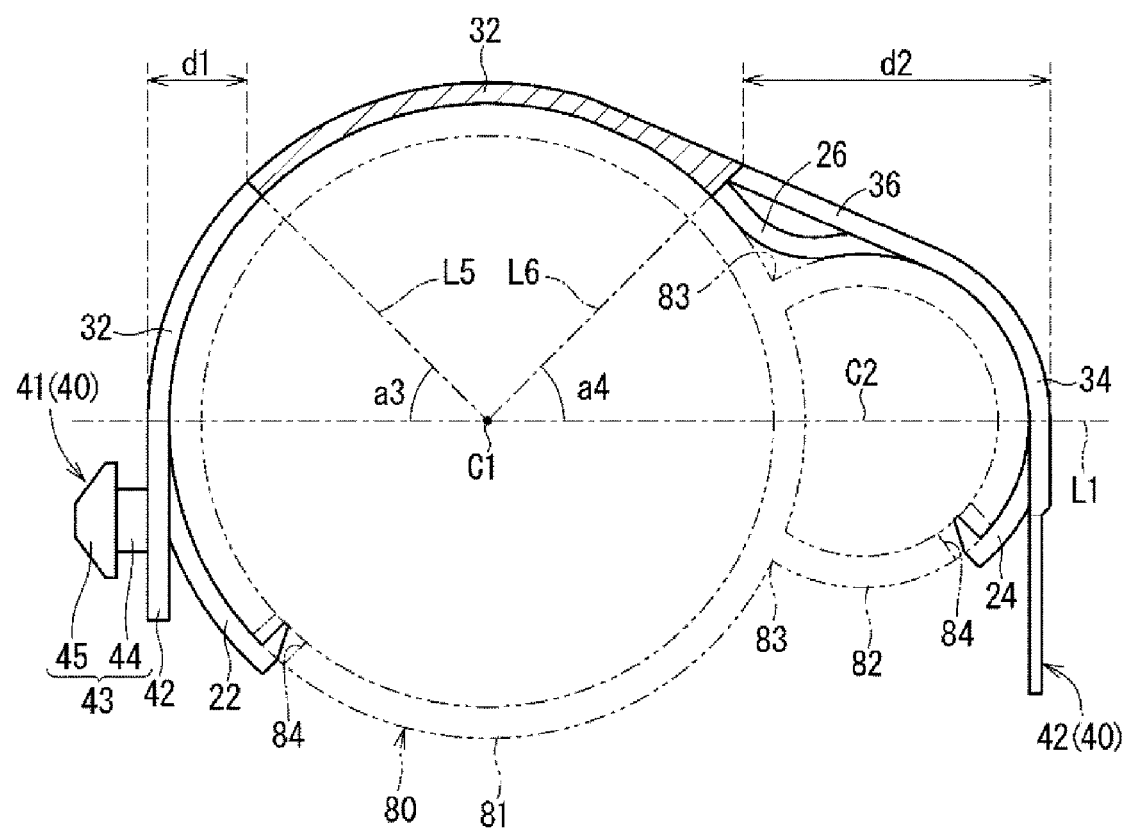
FIG. 4 is a cross-sectional view taken along line IV-IV of FIG. 3.
Figure 5:
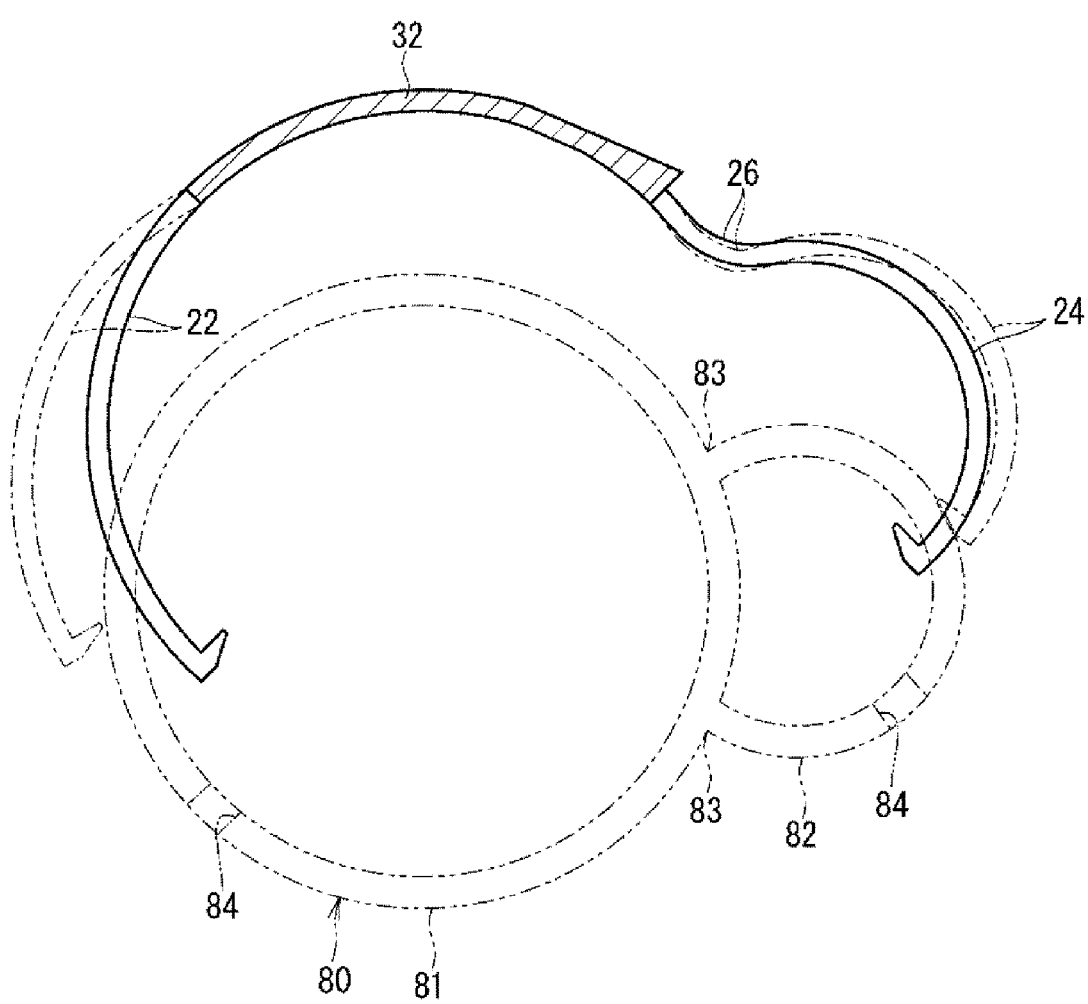
FIG. 5 is a cross-sectional view taken along line V-V of FIG. 3.

A support member, a wiring member with a support member, and an attachment structure for a wiring member according to embodiments will be described below. FIG. 1 is a perspective view illustrating a support member 10 according to an embodiment. FIG. 2 is a front view illustrating the support member 10 according to the embodiment. FIG. 3 is a plan view illustrating the support member 10 according to the embodiment. FIG. 4 is a cross-sectional view taken along line IV-IV of FIG. 3. FIG. 5 is a cross-sectional view taken along line V-V of FIG. 3.

<Support Member>

First, a rod-like member 80 to which the support member 10 is attached will be described. The rod-like member 80 is a member installed in a vehicle. The rod-like member 80 is a member that reinforces the vehicle to increase the rigidity of the frame of the vehicle, examples including a reinforcement, a beam, a reinforcing bar, and the like. The reinforcement may be reinforcement for the instrument panel installed behind the instrument panel, for example. The rod-like member 80 is constituted by a plurality of rod-like portions connected to one another in the radial direction. In this example, the plurality of rod-like portions include a first rod-like portion 81 and a second rod-like portion 82. The first rod-like portion 81 and the second rod-like portion 82 have a circular transverse cross-section. The first rod-like portion 81 and the second rod-like portion 82 are cylindrical. The second rod-like portion 82 is narrower than the first rod-like portion 81. In this example, the outer diameter of the second rod-like portion 82 is approximately half of the outer diameter of the first rod-like portion 81. However, the rod-like member 80 is not limited to that described above. For example, the rod-like member 80 may be constituted by three or more rod-like portions connected together. Also, for example, the transverse cross-section of the first rod-like portion and the second rod-like portion may be a shape other than a circle, such as a polygon. Also, for example, the first rod-like portion and the second rod-like portion may have a column-like shape. Also, for example, the first rod-like portion and the second rod-like portion may have the same thickness. Also, for example, the outer diameter of the second rod-like portion may be greater or less than half of the outer diameter of the first rod-like portion.

At a connection portion 83 of the first rod-like portion 81 and the second rod-like portion 82, a predetermined region in the circumferential direction of each rod-like portion overlaps. In this example, a region approximately one third of the second rod-like portion 82 in the circumferential direction overlaps with the first rod-like portion 81. In the example illustrated in FIG. 1, at the connection portion 83, the circumferential surface of the first rod-like portion 81 remains as is, while the circumferential surface of the second rod-like portion 82 is partially interrupted. At the connection portion 83, the two end surfaces of the second rod-like portion 82 in the circumferential direction are in contact with the circumferential surface of the first rod-like portion 81. Naturally, the shape of the first rod-like portion 81, the second rod-like portion 82, and the connection portion 83 are not limited to that described above. For example, circumferential surfaces of the first rod-like portion 81 and the second rod-like portion 82 may be in contact.

The rod-like member 80 may be formed via molding with the first rod-like portion 81 and the second rod-like portion 82 connected. The rod-like member 80 may be formed by joining via welding the separately formed first rod-like portion 81 and second rod-like portion 82.

Figure 6:
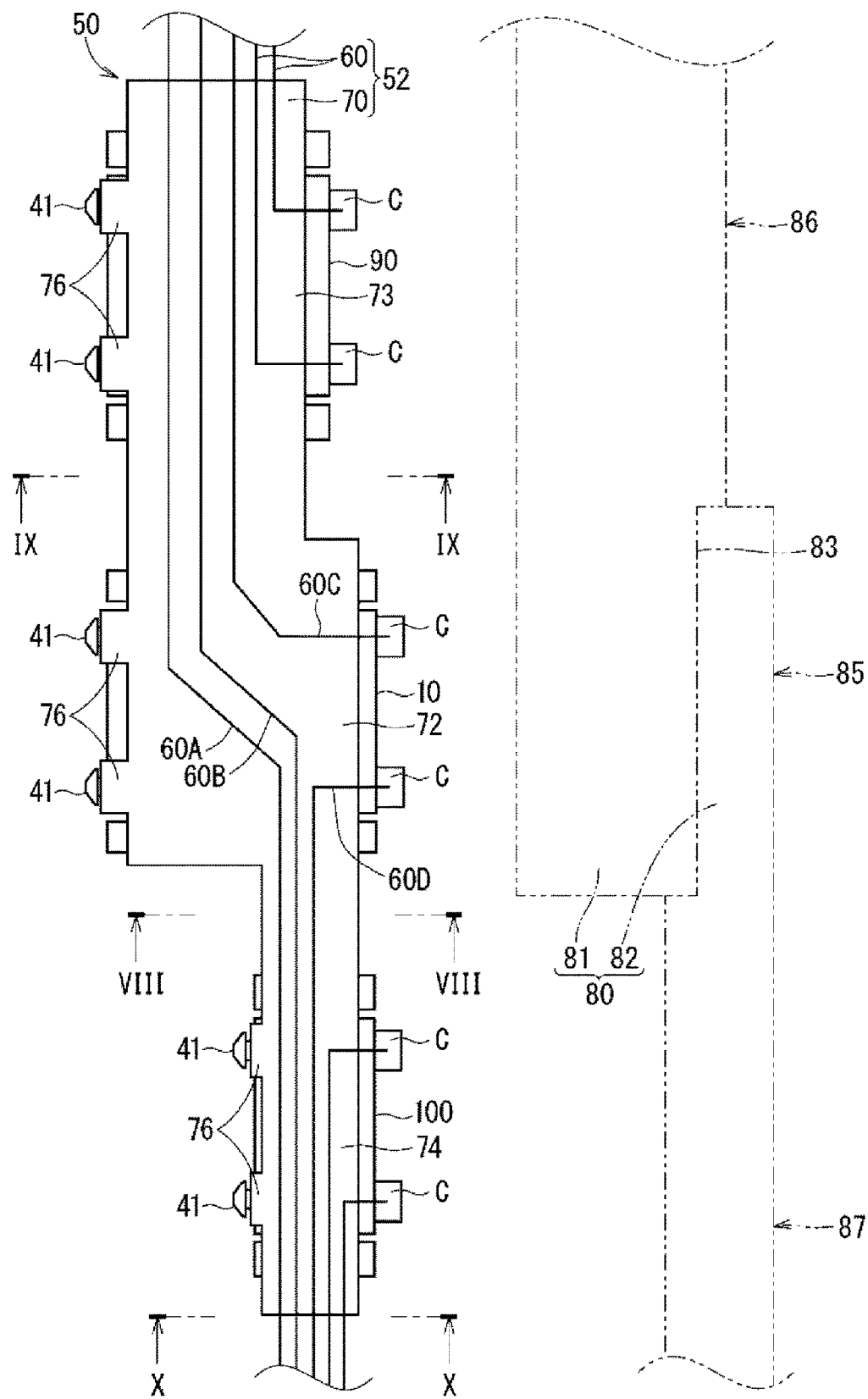
FIG. 6 is a decomposition plan view of an attachment structure for a wiring member according to an embodiment.

In the rod-like member 80, from the connected section of the first rod-like portion 81 and the second rod-like portion 82, only the first rod-like portion 81 extends on one side and only the second rod-like portion 82 extends on the other side (see FIG. 6). Hereinafter, when observing the rod-like member 80 along the longitudinal direction, the connected section of the first rod-like portion 81 and the second rod-like portion 82 may be referred to as a connection part 85, the portion where only the first rod-like portion 81 extends may be referred to as a first part 86, and the portion where only the second rod-like portion 82 extends may be referred to as a second part 87. The rod-like member may be formed in a shape omitting either one or both of the first part 86 and the second part 87.

A locking recess portion 84 is formed in the rod-like member 80. A locking projection 28 provided on the support member 10 engages with the locking recess portion 84. The locking recess portion 84 is formed with a shape and at a position that corresponds to the locking projection 28. The locking recess portion 84 is formed on both the first rod-like portion 81 and the second rod-like portion 82. In the connection part 85, a plurality of the locking recess portions 84 are formed at intervals in the axial direction in the first rod-like portion 81. In the connection part 85, a plurality of the locking recess portions 84 are formed at intervals in the axial direction in the second rod-like portion 82.

Figure 9:
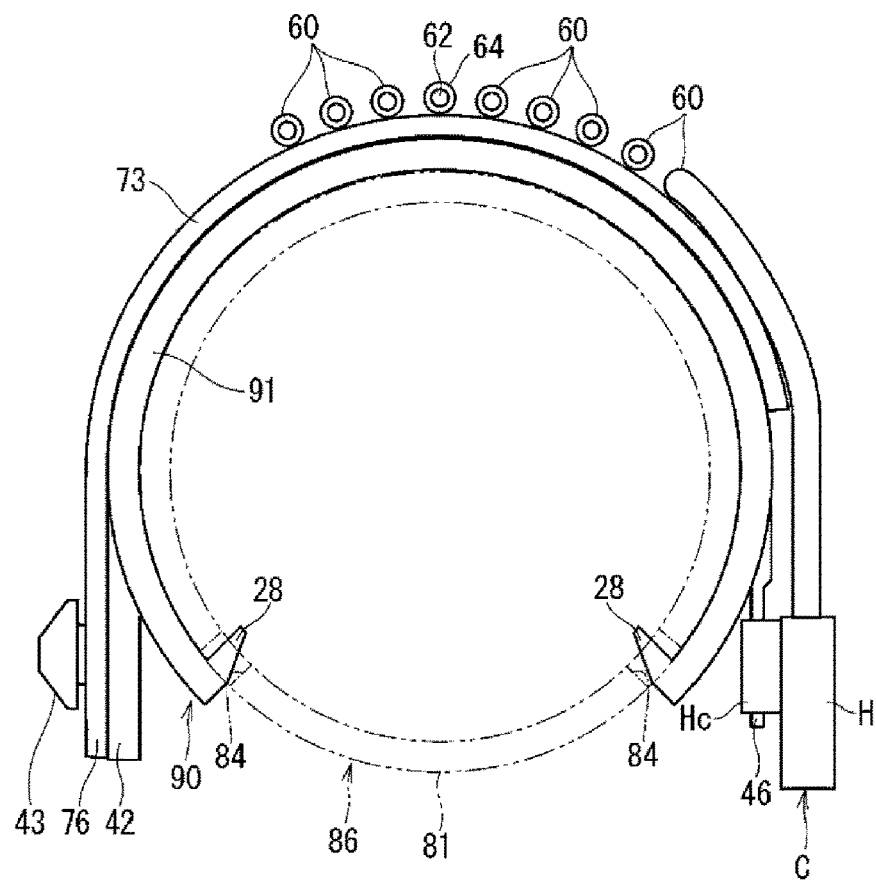
FIG. 9 is a cross-sectional view taken along line IX-IX of FIG. 6.
Figure 10:
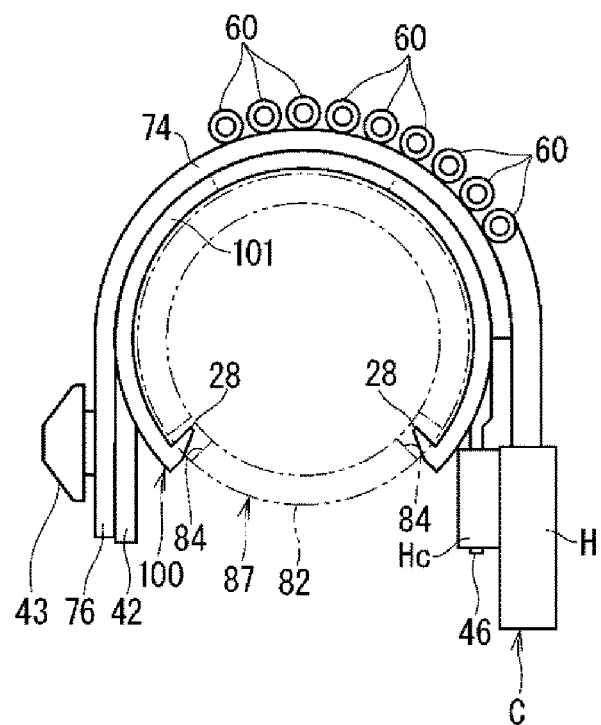
FIG. 10 is a cross-sectional view taken along line X-X of FIG. 6.

Note that the locking recess portion 84 is also formed in the first part 86 and the second part 87 (see FIGS. 9 and 10). A support member 90 for a first part, described below, attaches to the locking recess portion 84 formed in the first part 86. A support member 100 for a second part, described below, attaches to the locking recess portion 84 formed in the second part 87.

A line L1 in FIG. 2 is a line that runs through a center C1 of the first rod-like portion 81 and a center C2 of the second rod-like portion 82. A line L2 in FIG. 2 is a line that runs through the center C1 of the first rod-like portion 81 and a center of the locking recess portion 84 formed on the first rod-like portion 81. A line L3 in FIG. 2 is a line that runs through the center C2 of the second rod-like portion 82 and a center of the locking recess portion 84 formed on the first rod-like portion 81. A line L4 in FIG. 2 is a tangent line common to both the first rod-like portion 81 and the second rod-like portion 82. A gap is formed between the tangent line L4 common to the first rod-like portion 81 and the second rod-like portion 82 in the rod-like member 80 and the connection portion 83.

<Support Member>

The support member 10 according to the embodiment will now be described. The support member 10 attaches to the rod-like member 80. The support member 10 is a member for attaching a wiring member 50, described below, to the rod-like member 80. The support member 10 is provided with an engagement portion 20. The support member 10 is further provided with a body portion 30 and an attachment portion 40. A slit S is formed in the support member 10.

The engagement portion 20 is configured to fit over the plurality of rod-like portions 81, 82 and engage with the outer circumferential portion of the rod-like member 80. The engagement portion 20 includes a first engagement portion 22 and a second engagement portion 24. The first engagement portion 22 is the portion that covers the first rod-like portion 81. The second engagement portion 24 is the portion that covers the second rod-like portion 82. The first engagement portion 22 and the second engagement portion 24 are joined at the end portions in the circumferential direction. The portion where the first engagement portion 22 and the second engagement portion 24 are joined may be referred to as a joined portion 26.

The end portion of the first engagement portion 22 on the opposite side to the joined portion 26 in the circumferential direction corresponds to a first end portion of the engagement portion 20 in the circumferential direction. The end portion of the second engagement portion 24 on the opposite side to the joined portion 26 in the circumferential direction corresponds to a second end portion of the engagement portion 20 in the circumferential direction. The positions of the first end portion and the second end portion of the engagement portion 20 in the circumferential direction are not particularly limited. However, in this example, the first end portion and the second end portion of the engagement portion 20 in the circumferential direction extend to a position beyond the line L1. The position of the first end portion of the engagement portion 20 in the circumferential direction relative to the center C1 of the first rod-like portion 81 and the position of the second end portion of the engagement portion 20 in the circumferential direction relative to the center C2 of the second rod-like portion 82 are similar. In other words, an angle a1 formed by the line L1 and the line L2 is the same as an angle a2 formed by the line L1 and the line L3. It can be said that the first engagement portion 22 and the second engagement portion 24 are similar regarding the portion beyond the line L1.

The locking projection 28 is provided at the first end portion of the engagement portion 20 in the circumferential direction. In a similar manner, the locking projection 28 is also provided at the second end portion of the engagement portion 20 in the circumferential direction. The locking projection 28 is configured to lock together with the locking recess portion 84. The engagement portion 20 is locked together with the rod-like member 80 by locking together the locking projections 28 on both end portions of the engagement portion 20 in the circumferential direction with the corresponding locking recess portions 84. In this manner, the engagement portion 20 is aligned with the rod-like member 80 with respect to the longitudinal direction, the circumferential direction, and the radial direction.

The portion of the engagement portion 20 that covers the connection portion 83 is formed recessed toward the connection portion 83. The circumferential end portion of the first engagement portion 22 on the joined portion 26 side comes into contact with the first rod-like portion 81 at a position beyond a contact point between the common tangent line L4 and the first rod-like portion 81. The circumferential end portion of the second engagement portion 24 on the joined portion 26 side comes into contact with the second rod-like portion 82 at a position beyond a contact point between the common tangent line L4 and the second rod-like portion 82. The joined portion 26 is joined at a position with a small gap formed between the joined portion 26 and the connection portion 83. The joined portion 26 is bent in the opposite direction to the first engagement portion 22 and the second engagement portion 24. Thus, when a force is applied in the direction in which the engagement portion 20 extends, stress tends to be concentrated at the joined portion 26.

The body portion 30 is contiguous with the engagement portion 20 in the axial direction. The axial direction of the support member 10 is parallel with the axial direction of the rod-like member 80. The portion of the body portion 30 that covers the connection portion 83 is formed in a flat shape. Specifically, the body portion 30 includes a first body portion 32, a second body portion 34, and a third body portion 36. The first body portion 32 is the portion that covers the first rod-like portion 81. The second body portion 34 is the portion that covers the second rod-like portion 82. The third body portion 36 is the portion where the first body portion 32 and the second body portion 34 are joined. The third body portion 36 is the portion that covers the connection portion 83. The third body portion 36 is formed flat.

To describe in more detail, the first body portion 32 is the portion that extends from the intersection point between the common tangent line L4 and the first rod-like portion 81 to the circumferential first end portion side of the engagement portion 20. The first body portion 32 extends around the first rod-like portion 81. The length dimension of the first body portion 32 in the circumferential direction is one fourth of the circumferential length of the first rod-like portion 81. The second body portion 34 is the portion that extends from the intersection point between the common tangent line L4 and the second rod-like portion 82 to the circumferential second end portion side of the engagement portion 20. The second body portion 34 extends around the second rod-like portion 82. The length dimension of the second body portion 34 in the circumferential direction is one fourth of the circumferential length of the second rod-like portion 82. The third body portion 36 extends from the intersection point between the common tangent line L4 and the first rod-like portion 81 to the intersection point between the common tangent line L4 and the second rod-like portion 82. The third body portion 36 extends in the same direction as the common tangent line L4. Thus, the third body portion 36 is not recessed toward the connection portion 83 of the first rod-like portion 81 and the second rod-like portion 82.

The slit S is formed between the engagement portion 20 and the body portion 30. In this example, the engagement portion 20, the body portion 30, and the engagement portion 20 are contiguous in this order in the axial direction. The slit S is provided on both sides of the body portion 30 in the axial direction. The slit S includes a first slit S1 and a second slit S2. The first slit S1 is formed on the first rod-like portion 81 side. The second slit S2 is formed on the second rod-like portion 82 side. The second slit S2 is formed with a greater depth than the first slit S1. The depth of the slit S being deep refers to the size of the dimension in the radial direction being large.

More specifically, a dimension d1 in FIG. 4 is the depth dimension of the first slit S1. A dimension d2 in FIG. 4 is the depth dimension of the second slit S2. The dimension d2 is greater than the dimension d1. Note that the dimensions d1, d2 are dimensions from the outer surface of the engagement portion 20 or the body portion 30 to the terminating end of the slits S1, S2 in the direction in which the line L1 extends.

The second slit S2 is formed extending beyond the joined portion 26 and into the first engagement portion 22 side. The first slit S1 and the second slit S2 are formed so as to meet the first rod-like portion 81 at axisymmetric positions. In FIG. 4, a line L5 is a line that runs through the center C1 of the first rod-like portion 81 and the terminating end of the first slit S1. In FIG. 4, a line L6 is a line that runs through the center C1 of the first rod-like portion 81 and the terminating end of the second slit S2. An angle a3 formed by the line L1 and the line L5 is the same as an angle a4 formed by the line L1 and the line L6. The circumferential length of the support member 10 at the portion where the slit S is formed is one fourth of the circumferential length of the first rod-like portion 81.

The third body portion 36 is located at the terminating end of the second slit S2. Thus, the slit S can be said to be formed in the body portion 30. The slit S may be formed in the engagement portion 20.

The first body portion 32 is located at the terminating end of the first slit S1. The first slit S1 is formed extending in the circumferential direction to an intermediate portion of the first body portion 32. The first slit S1 does not reach the contact point between the common tangent line L4 and the first rod-like portion 81. A portion of the first body portion 32 is joined to the first engagement portion 22 in the axial direction.

The second slit S2 is formed extending to an intermediate portion of the third body portion 36. The second slit S2 does not reach the contact point between the common tangent line L4 and the first rod-like portion 81. A portion of the third body portion 36 is joined to the first engagement portion 22 in the axial direction. The second body portion 34 and the third body portion 36 are not joined to the second engagement portion 24 and the joined portion 26 in the axial direction. The second slit S2 may reach the contact point between the common tangent line L4 and the first rod-like portion 81.

The engagement portion 20 is shorter than the body portion 30 in the axial direction. In other words, the width dimension of the engagement portion 20 in the axial direction is less than the width dimension of the body portion 30 in the axial direction. Also, the width dimension of the slit S in the axial direction is less than the width dimension of the engagement portion 20 in the axial direction. The slit S is a groove with a width dimension. This allows the engagement portion 20 and the body portion 30 to not interfere with one another when the engagement portion 20 deforms. The slit may be a cut with no width dimension.

The wiring member 50 is provided in an attachable manner on the outer side of the engagement portion 20 and the body portion 30. In this example, the wiring member 50 is provided in an attachable manner on the attachment portion 40 with the wiring member 50 disposed on the outer side of the engagement portion 20 and the body portion 30. The attachment portion 40 includes a first attachment portion 41 and a second attachment portion 46. The first attachment portion 41 is provided on the circumferential first end portion of the support member 10. The second attachment portion 46 is provided on the circumferential second end portion of the support member 10. In this example, the first attachment portion 41 and the second attachment portion 46 are provided projecting from the body portion 30.

In this example, the first attachment portion 41 is provided in a manner allowing a sheet 70, described below, provided on the wiring member 50 to be attached. The first attachment portion 41 includes a projection piece 42 and a locking portion 43. The projection piece 42 projects from the circumferential first end portion of the body portion 30. The projection direction of the projection piece 42 is a direction orthogonal to the line L1. The locking portion 43 is provided on the outer surface of the projection piece 42. The locking portion 43 includes a pillar portion 44 and a cap portion 45. The pillar portion 44 is provided projecting parallel with the line L1 from the outer surface of the projection piece 42. The cap portion 45 is provided on the tip of the pillar portion 44. The cap portion 45 is formed in a truncated cone shape. The cap portion 45 is formed tapering toward the tip of the pillar portion 44. The portion of the cap portion 45 on the base end side of the pillar portion 44 is formed to be thicker than the pillar portion 44. The locking portion 43 is inserted and locked in a hole 77, described below, formed in the sheet 70 of the wiring member 50.

The second attachment portion 46 is provided in a manner allowing a connector C including a cassette Hc, described below, to be attached. The second attachment portion 46 includes a projection piece 47. The projection piece 47 projects from the circumferential second end portion of the body portion 30. The projection direction of the projection piece 47 is a direction orthogonal to the line L1. A locking hole 48 is formed in the projection piece 47. The locking hole 48 extends through the projection piece 47 in the thickness direction. The connector C including the cassette Hc is attached to the second attachment portion 46 by inserting the projection piece 47 into the cassette Hc and locking the projection of the cassette Hc into the locking hole 48.

The operation of attaching the support member 10 to the rod-like member 80 will now be described. In the example illustrated in FIG. 5, the first engagement portion 22 and the second engagement portion 24 are simultaneously engaged with the rod-like member 80. Naturally, however, the support member 10 may be attached to the rod-like member 80 by first engaging the first engagement portion 22 or the second engagement portion 24 with the rod-like member 80, and then engaging the other with the rod-like member 80.

In the example illustrated in FIG. 5, the support member 10 is moved in a direction orthogonal to the line L1 and attached to the rod-like member 80. When the support member 10 is moved toward the rod-like member 80, the first engagement portion 22 and the second engagement portion 24 come into contact with the rod-like member 80. By applying a force to the support member 10 in this state, the first engagement portion 22 and the second engagement portion 24 open outward and elastically deform as illustrated in by the two-dot chain lines in FIG. 5. At this time, on the first engagement portion 22 side, the circumferential first end portion of the engagement portion 20 mainly opens outward and elastically deforms pivoting about the portion (the terminating end side portion of the first slit S1) joined to the first body portion 32. Also, on the second engagement portion 24 side, the circumferential second end portion of the engagement portion 20 mainly opens outward and elastically deforms pivoting about the joined portion 26 and therearound. As the rod-like member 80 is moved further inside the support member 10, the first engagement portion 22 and the second engagement portion 24 transition from opening to elastically returning. Then, when the rod-like member 80 is housed at a predetermined position inside the support member 10, the first engagement portion 22 and the second engagement portion 24 elastically return until the locking projection 28 locks into the locking recess portion 84. In this manner, the support member 10 is put into a state of being attached to the rod-like member 80.

<Attachment Structure for a Wiring Member and Wiring Member with a Support Member>

Figure 7:
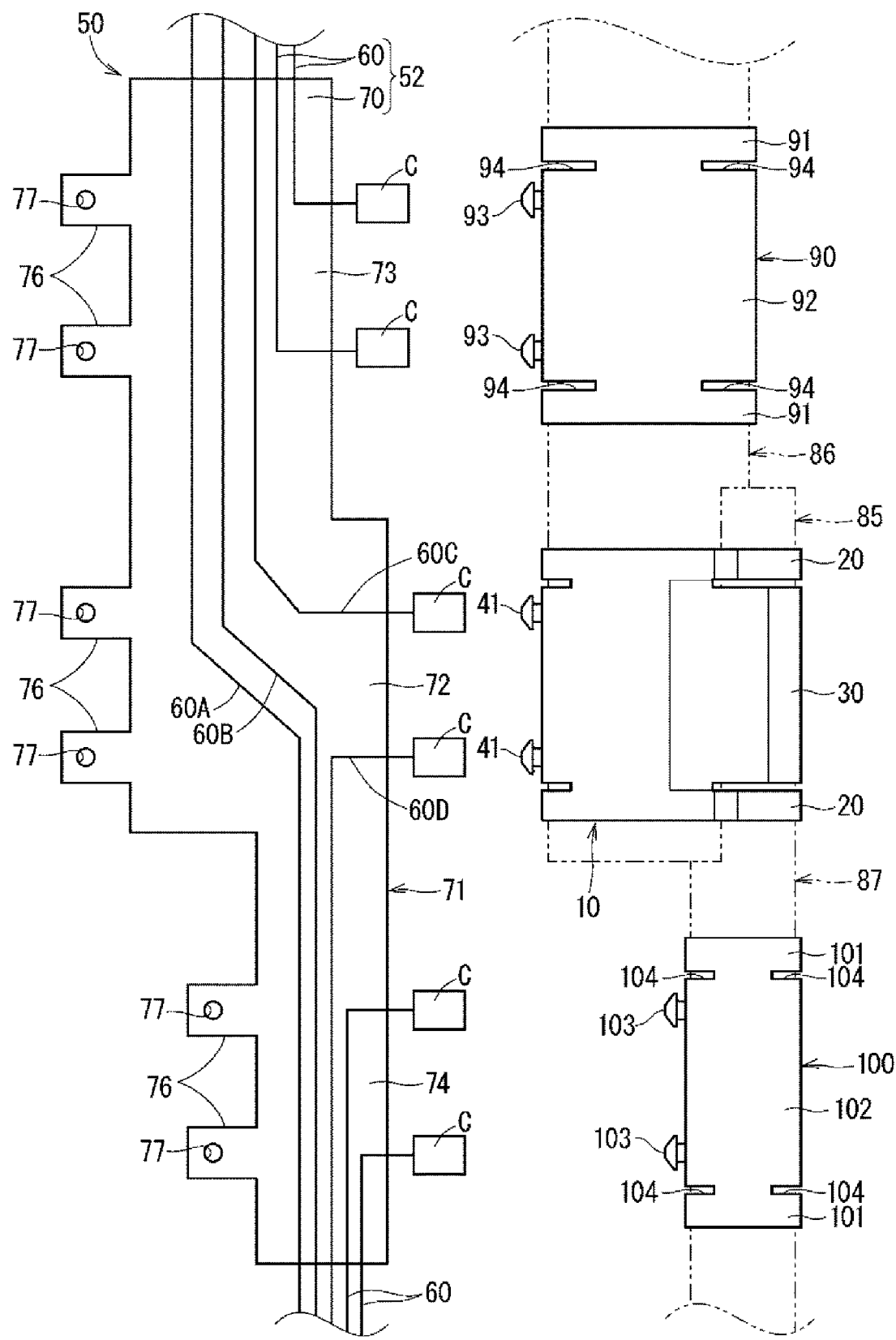
FIG. 7 is a decomposition plan view of a wiring member with a support member according to an embodiment.
Figure 8:
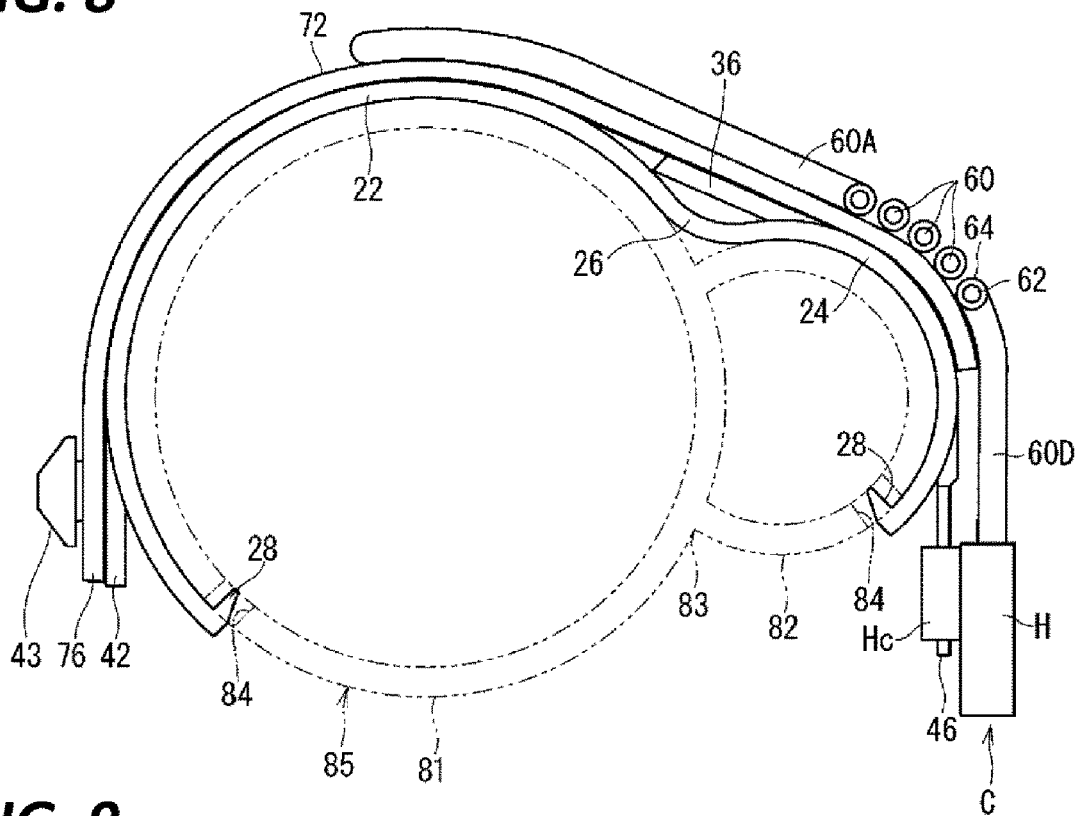
FIG. 8 is a cross-sectional view taken along line VIII-VIII of FIG. 6.

Next, an attachment structure for a wiring member and a wiring member with a support member according to the embodiment will be described. FIG. 6 is a decomposition plan view of an attachment structure for a wiring member according to the embodiment. FIG. 7 is a decomposition plan view of a wiring member with a support member according to the embodiment. FIG. 8 is a cross-sectional view taken along line VIII-VIII of FIG. 6. FIG. 9 is a cross-sectional view taken along line IX-IX of FIG. 6. FIG. 10 is a cross-sectional view taken along line X-X of FIG. 6.

The attachment structure for a wiring member corresponds to a structure including the wiring member 50 attached to the rod-like member 80 via the support member 10. In other words, the attachment structure for a wiring member is a structure including the support member 10 attached to the rod-like member 80 and the wiring member 50 attached to the support member 10. Note that of the process of attaching the support member 10 to the rod-like member 80 and the process of attaching the wiring member 50 to the support member 10, either process may be performed first. In other words, the wiring member 50 may be first attached to the support member 10, and then the support member 10 to the rod-like member 80. Alternatively, the support member 10 may be first attached to the rod-like member 80, and then the wiring member 50 to the support member 10.

The wiring member with a support member is a member including the wiring member 50 attached to the support member 10. The wiring member 50 is supported by the support member 10.

The attachment structure for a wiring member and the wiring member with a support member are further provided with, separate from the support member 10 described above, the support member 90 for the first part (simply referred to as the support member 90 below) and the support member 100 for the second part (simply referred to as the support member 100 below). The support member 90 attaches to the first part 86. The support member 100 attaches to the second part 87. The support members 90, 100 are attached at a position with a gap between the support members 90, 100 and the support member 10 in the axial direction.

The support member 90, in a similar manner to the support member 10, includes an engagement portion 91, a body portion 92, and an attachment portion 93. The engagement portion 91 and the body portion 92 are connected in the axial direction. The engagement portion 91 and the body portion 92 are formed with a shape that corresponds to the first rod-like portion 81. A slit 94 is formed between the engagement portion 91 and the body portion 92. The attachment portion 93 is provided on the body portion 92. As the attachment portion 93, the same portions as the first attachment portion 41 and the second attachment portion 46 may be provided.

The support member 100, in a similar manner to the support member 10, includes an engagement portion 101, a body portion 102, and an attachment portion 103. The engagement portion 101 and the body portion 102 are connected in the axial direction. The engagement portion 101 and the body portion 102 are formed with a shape that corresponds to the second rod-like portion 82. A slit 104 is formed between the engagement portion 101 and the body portion 102. The attachment portion 103 is provided on the body portion 102. As the attachment portion 103, the same portions as the first attachment portion 41 and the second attachment portion 46 may be provided.

<Wiring Member>

The wiring member 50 is a wiring member 50 for a vehicle that is connected to a component installed in the vehicle and transmits electricity or light to the component. Thus, the wiring member 50 includes a transmission member for transmitting electricity or light. The wiring member 50 is formed flat. In the example described below, the wiring member 50 is a wiring body 52 with a sheet. The wiring body 52 with a sheet includes a plurality of linear transmission members 60 and the sheet 70. Note that in the example illustrated in FIG. 7, the linear transmission members 60 extending along the same path are illustrated as a single line. Accordingly, the linear transmission members 60 illustrated as a single line in FIG. 7 may be thought as the plurality of linear transmission members 60.

The linear transmission members 60 are only required to be members with a linear shape for transmitting electricity, light, or the like. For example, the linear transmission members 60 may be typically electrical wires including a core wire and a cover around the core wire, or may be naked lead wires, shielded wires, enamel wires, nichrome wires, optical fibers, or the like.

The linear transmission members 60 for transmitting electricity may be various signal lines, or various electric power lines. The linear transmission members 60 for transmitting electricity may be used as an antenna, coil, or the like that transmits to space or receives from space signals or power.

The linear transmission members 60 include a transmission line body that transmits electricity, light, or the like and a cover that covers the transmission line body. In a case where the linear transmission member 60 is a typical electrical wire, the transmission line body is a core wire 62 and the cover is an insulating cover 64. The core wire 62 may be constituted by a plurality of individual wires. The plurality of individual wire may be twisted. The diameter, structure, and the like of the plurality of linear transmission members 60 arranged on one sheet 70 may be set as appropriate, and the arranged linear transmission members 60 may have the same diameter and structure, or the linear transmission members 60 with different diameters, structures, and the like may be arranged on the same sheet 70.

The linear transmission members 60 may be a single linear object or may be a composite object of a plurality of linear objects (twisted wires, cables with a sheath covering a plurality of linear objects bundled together, or the like). A terminal, connector, or the like is provided on the end portion of the linear transmission members 60 as appropriate depending on the connection method of the linear transmission members 60 with the partner member.

In this example, the connector C is provided on the end portion of the linear transmission members 60. The connector C connects to the connector on the partner side provided on an electronic component or the like, for example. In this example, the connector C is provided on one side portion of the wiring member 50. The connector C is formed with the end portions of the linear transmission members 60 housed in the cavity of a housing H. The housing H may be fixed directly to the sheet 70 or may not be fixed. The cassette Hc is provided on the housing H. One side portion of the wiring member 50 is fixed to the support member 10 by the second attachment portion 46 being inserted into the cassette Hc and fixed.

In this example, a plurality of the connectors C are provided on one side portion of the wiring member 50. The plurality of connectors C are provided at intervals in the longitudinal direction of the rod-like member 80. The plurality of connectors C are provided in a manner allowing for connection in the same direction, however, the plurality of connectors C may connect in different directions.

The plurality of linear transmission members 60 are preferably routed on the sheet 70 along a path in the vehicle. By routing the plurality of linear transmission members 60 on the sheet 70 along a path in the vehicle, the path of the plurality of linear transmission members 60 is restricted, and installation of the wiring member 50 in the vehicle is simplified.

The plurality of linear transmission members 60 are arranged side by side and fixed on the sheet 70. The sheet 70 maintains the linear transmission members 60 in this wiring arrangement. In this example, the sheet 70 is provided on only one surface of the linear transmission members 60, however the sheet 70 may be provided on both surfaces of the linear transmission members 60.

The sheet 70 includes a sheet body 71 and an attachment piece 76. The linear transmission members 60 are routed on the sheet body 71. The sheet body 71 includes a first sheet body 72, a second sheet body 73, and a third sheet body 74. The first sheet body 72 is the portion located on the support member 10. The second sheet body 73 is the portion located on the support member 90. The third sheet body 74 is the portion located on the support member 100. In the example illustrated in FIG. 6, the first sheet body 72 and the second sheet body 73 are joined, however, the first sheet body 72 and the second sheet body 73 may not be joined. In the example illustrated in FIG. 6, the first sheet body 72 and the third sheet body 74 are joined, however, the first sheet body 72 and the third sheet body 74 may not be joined. In other words, the sheet 70 may not be provided in the portions between the support members 10, 90, 100 in the longitudinal direction of the linear transmission members 60.

The attachment piece 76 projects from the side edge of the first sheet body 72, the second sheet body 73, and the third sheet body 74. The attachment piece 76 is provided at a position corresponding to the projection piece 42. The hole 77 is formed in the attachment piece 76. The hole 77 is provided at a position corresponding to the locking portion 43. The hole 77 is formed smaller than the cap portion 45. One side portion of the sheet body 71 is attached to the support members 10, 90, 100 by inserted and locking the cap portion 45 in the hole 77. By attaching the attachment piece 76 to the first attachment portion 41 and attaching the connector C to the second attachment portion 46, the wiring member 50 is attached to the support members 10, 90, 100.

How the linear transmission members 60 and the sheet 70 are fixed together is not particularly limited, and bonding, welding, or the like may be used. Bonding refers to using an adhesive, double sided adhesive tape, or other intermediary to join two members together. Welding refers to melting the resin in at least one of two members and joining the two members together without using an intermediary. In this example, the linear transmission members 60 and the sheet 70 are fixed together by melting at least one of the resin in the insulating cover 64 of the linear transmission members 60 and the resin in the sheet 70 and joining the two members together.

The material of the sheet 70 is not particularly limited. However, the sheet 70 may be made from a material including a resin, such as polyvinyl chloride (PVC), polyethylene terephthalate (PET), polypropylene (PP), nylon, and the like. The sheet 70 may be a fiber material containing fiber including a nonwoven fabric, a fabric, a knitted fabric, or the like, or may be a non-fiber material. A non-fiber material may be a solid member with its inside uniformly filled, a foamed body formed by foaming a resin, or the like. The sheet 70 may also include a material such as a metal.

The sheet 70 may be a single layer or may be multilayer. In a case where the sheet 70 is multilayer, for example, it is plausible that resin layers are stacked on one another. Also, for example, it is plausible that resin layers and metal layers are stacked on one another. Furthermore, the sheet 70 may be formed by stacking non-fiber material layers and non-fiber material layers on one another, may be formed by stacking non-fiber material layers and fiber material layers on one another, or may be formed by stacking fiber material layers and fiber material layers on one another.

The sheet 70 is a two layer structure, for example. The first layer of the sheet 70 is a layer for fixing the linear transmission members 60. For example, the first layer is formed as a solid member with its inside uniformly filled with the same resin material as the insulating cover 64 of the linear transmission members 60. The linear transmission members 60 are fixed on the first layer. The second layer is a layer for increasing the function of the sheet 70. For example, the second layer is a nonwoven fabric. The first layer may be provided in the entire area the second layer is provided or provided partially in the area the second layer is provided. For example, the first layer may be provided in only an intermediate portion of the second layer in the width direction (the arrangement direction of the linear transmission members 60) and not provided at the side edge portions. Also, for example, the first layer may be provided at intervals in the longitudinal direction (longitudinal direction of the linear transmission members 60) of the second layer. The sheet 70 has sufficient flexibility to bend around the support member 10 from a flat state.

On the linear transmission members 60 routed on the support member 10, linear transmission members 60A, 60B that extend outward from the support member 10 in the axial direction are present. On the linear transmission members 60 routed on the support member 10, linear transmission members 60A, 60B, 60C, 60D that bend on the support member 10 are present. The linear transmission members 60C, 60D bend on the support member 10 to connect to the connector C provided on the side of the sheet 70. The linear transmission members 60A, 60B extend from the first part 86 of the rod-like member 80 toward the second part 87 of the rod-like member 80. Because the first rod-like portion 81 and the second rod-like portion 82 are offset in terms of position in the radial direction, the linear transmission members 60A, 60B need to bend at the first part 86, the second part 87, or therebetween. In this example, the linear transmission members 60A, 60B bend at the connection part 85.

Next, let's consider a case where the linear transmission members 60A, 60B do not bend at the connection part 85 and bend at the first part 86 or the second part 87. In this case, the linear transmission members 60A, 60B may be routed to extend beyond the end surface of the first rod-like portion 81 or the end surface of the second rod-like portion 82. When the wiring member 50 is first formed flat and then attached bending around the support member 10, a difference in paths may occur in the linear transmission members. This path difference may occur when the linear transmission member extends beyond the end surface of the first rod-like portion 81 or the end surface of the second rod-like portion 82. Depending on the path difference, the linear transmission members may experience a tensile force, the linear transmission members 60 may lift off the sheet 70, or the like.

Thus, in this example, the linear transmission members 60A, 60B bend at the connection part 85. Accordingly, when the wiring member 50 is first formed flat and then attached bending around the support member 10, a difference in paths is less likely to occur in the linear transmission members 60A, 60B. This makes it less likely that the linear transmission members 60A, 60B experience a tensile force or that the linear transmission members 60A, 60B lift off the sheet 70.

Also in this example, the linear transmission members 60A, 60B bend at the third body portion 36. Accordingly, the linear transmission members 60A, 60B bend at the portion held flat even after the wiring member 50 is attached to the support member 10.

Next, let's consider a case where the linear transmission members 60A, 60B bend on the joined portion 26 of the engagement portion 20. In this case, the sheet 70 on which the linear transmission members are fixed is held flat, and a gap may be formed between the sheet 70 and the joined portion 26. Thus, the sheet 70 may deform toward the joined portion 26. At this time, the linear transmission members may also deform toward the joined portion 26. Because of this deformation, the linear transmission members may experience a tensile force, the linear transmission members may lift off the sheet 70, or the like.

Thus, in this example, the linear transmission members 60A, 60B bend at the third body portion 36. This makes the sheet 70 less likely to deform and also makes the linear transmission members 60A, 60B less likely to deform. This makes it less likely that the linear transmission members 60A, 60B experience a tensile force or that the linear transmission members 60A, 60B lift off the sheet 70.

In this example, of the linear transmission members 60 and the sheet 70, the sheet 70 is disposed on the support members 10, 90, 100 side. This helps prevent the linear transmission members 60 rubbing against the circumferential edge of the slits S 94, 104. This also helps prevent the linear transmission members 60 coming into contact with the rod-like member 80 at portions where the support members 10, 90, 100 are not present. Of the linear transmission members 60 and the sheet 70, the linear transmission members 60 may also be disposed on the support members 10, 90, 100 side. In this case, the sheet 70 is disposed on the outer side of the linear transmission members 60 to protect the linear transmission members 60 from the peripherally located members. This also, helps prevent the linear transmission members 60 from lifting off the sheet 70.

<Effects and the Like>

According to the support member 10, the wiring member with a support member, and the attachment structure for a wiring member configured as described above, the support member 10 is attached, via the engagement portion 20, to the rod-like member 80 including the plurality of rod-like portions 81, 82 connected in the radial direction. By using the support member 10, the wiring member 50 can be supported by the rod-like member 80 including the plurality of rod-like portions 81, 82 connected in the radial direction.

Because the slit S is formed between the engagement portion 20 and the body portion 30, when the engagement portion 20 is engaged with the rod-like member 80, the engagement portion 20 can easily deform with a small force, and the engagement portion 20 can be easily engaged with the rod-like member 80.

Because the second slit S2 is formed deeper than the first slit S1, when the engagement portion 20 is engaged with the rod-like member 80, the engagement portion 20 can easily deform with a small force, and the engagement portion 20 can be easily engaged with the rod-like member 80.

Because the engagement portion 20 is shorter than the body portion 30 in the axial direction, when the engagement portion 20 is engaged with the rod-like member 80, the engagement portion 20 can easily deform with a small force, and the engagement portion 20 can be easily engaged with the rod-like member 80.

Because the third body portion 36 of the body portion 30 that covers the connection portion 83 is formed flat, when the flat wiring member 50 is supported by the third body portion 36, the flat wiring member 50 resists deflection.

Because the joined portion 26 of the engagement portion 20 that covers the connection portion 83 is formed recessed toward the connection portion 83, the engagement portion 20 is more likely to deform pivoting about the joined portion 26 and therearound.

The wiring member 50 includes the plurality of linear transmission members 60 and the sheet 70 that holds the plurality of linear transmission members 60 in arrangement. This can help keep the height dimension of the wiring member 50 from the support member 10 low.

Modified Example

In the support member 10, the body portion 30 may be omitted. In other words, the support member may be formed with a shape where the engagement portion 20 is continuous in the axial direction. In the support member 10, even in a case where the body portion 30 is provided, the slit S may be omitted. For example, in a case such as where the amount of deformation needed for the engagement portion 20 to engage with the rod-like member 80 is low, it is plausible to omit the slit S.

It is not necessary to use the wiring body 52 with a sheet as the flat wiring member 50. As the flat wiring member, a flexible flat cable (FFC), a flexible printed circuit (FPC), or the like may be used. Also, the wiring member may not be flat. For example, the wiring member may be the plurality of linear transmission members 60 bundled together via a binding member.

The wiring member with a support member and the attachment structure for a wiring member is not necessarily provided with the support members 90, 100. One or both of the support members 90, 100 may be omitted.

In the wiring member 50, only the connector C is provided on one side portion and only the attachment piece 76 is provided on the other side portion. However, the configuration does not need to be so. In one or both of the one side portion and the other side portion, the connector C and the attachment piece 76 may both be present. The connector C and the attachment piece 76 may both be present at a side portion corresponding to one of the support members 10, 90, 100. The connector C and the attachment piece 76 may both be present at a side portion corresponding to the plurality of support members 10, 90, 100. At both the one side portion and the other side portion, only the connector C may be provided. At both the one side portion and the other side portion, only the attachment piece 76 may be provided.

Note that the configurations described in the embodiment and the modified examples can be appropriately combined with one another in a non-contradictory manner.

LIST OF REFERENCE NUMERALS

10 Support member
20 Engagement portion
22 First engagement portion
24 Second engagement portion
26 Joined portion
28 Locking projection
30 Body portion
32 First body portion
34 Second body portion
36 Third body portion
40 Attachment portion
41 First attachment portion
42 Projection piece
43 Locking portion
44 Pillar portion
45 Cap portion
46 Second attachment portion
47 Projection piece
48 Hole
50 Wiring member
52 Wiring body with sheet
60 Linear transmission member
62 Core wire
64 Insulating cover
70 Sheet
71 Sheet body
72 First sheet body portion
73 Second sheet body portion
74 Third sheet body portion
76 Attachment piece
77 Hole
80 Rod-like member
81 First rod-like portion
82 Second rod-like portion
83 Connection portion
84 Locking recess portion
85 Connection part
86 First part
87 Second part
90 Support member for first part
91 Engagement portion
92 Body portion
93 Attachment portion
94 Slit
100 Support member for second part
101 Engagement portion
102 Body portion
103 Attachment portion
104 Slit
C Connector
H Housing
Hc Cassette
S Slit
S1 First slit
S2 Second slit
L1, L2, L3, L4, L5, L6 Line
C1, C2 Center
a1, a2, a3, a4 Angle
d1, d2 Dimension

What is claimed is:

1. A support member configured to be attached to a rod-like member including a plurality of rod-like portions connected in a radial direction, comprising:
   an engagement portion configured to fit over the plurality of rod-like portions and engage with an outer circumferential portion of the rod-like member,
   a body portion contiguous with the engagement portion in an axial direction, and
   a plurality of slits formed in the axial direction between the engagement portion and the body portion, wherein
   a wiring member is provided in an attachable manner on an outer side of the engagement portion,
   the plurality of rod-like portions include a first rod-like portion and a second rod-like portion narrower than the first rod-like portion,
   the slits include a first slit formed on a first rod-like portion side and a second slit formed on the second rod-like portion side, and
   the second slit is formed deeper than the first slit.

2. A support member configured to be attached to a rod-like member including a plurality of rod-like portions connected in a radial direction comprising:
   an engagement portion configured to fit over the plurality of rod-like portions and engage with an outer circumferential portion of the rod-like member,
   a body portion contiguous with the engagement portion in an axial direction, and
   a plurality of slits formed in the axial direction between the engagement portion and the body portion, wherein
   a wiring member is provided in an attachable manner on an outer side of the engagement portion, and
   the engagement portion is shorter than the body portion in the axial direction.

3. The support member according to claim 1, wherein a portion of the body portion that covers a connection portion of the plurality of rod-like portions is formed in a flat shape.

4. The support member according to claim 1, wherein
a portion of the engagement portion that covers a connection portion of the plurality of rod-like portions is formed recessed toward the connection portion.

5. The support member according to claim 1, wherein
the wiring member includes the support member, and
the wiring member is supported by the support member.

6. The support member according to claim 5, wherein the wiring member includes a plurality of linear transmission members and a sheet that holds the plurality of linear transmission member in arrangement.

7. An attachment structure comprising:
the support member according to claim 5,
wherein the engagement portion is engaged with the rod-like member.

* * * * *